(No Model.)

C. J. COLEMAN.
GALVANIC BATTERY.

No. 495,306. Patented Apr. 11, 1893.

ATTEST:

M. W. Byrne

W. H. Holmes

INVENTOR:

Clyde J. Coleman,
by Robert Burns
Attorney.

UNITED STATES PATENT OFFICE.

CLYDE J. COLEMAN, OF CHICAGO, ILLINOIS.

GALVANIC BATTERY.

SPECIFICATION forming part of Letters Patent No. 495,306, dated April 11, 1893.

Application filed June 6, 1891. Serial No. 395,387. (No model.)

*To all whom it may concern:*

Be it known that I, CLYDE J. COLEMAN, a citizen of the United States, residing at Chicago, in the county of Cook and State of Illinois, have invented certain new and useful Improvements in Galvanic Batteries; and I do hereby declare the following to be a full, clear, and exact description of the same, reference being had to the accompanying drawings, forming a part of this specification.

Figure 1:
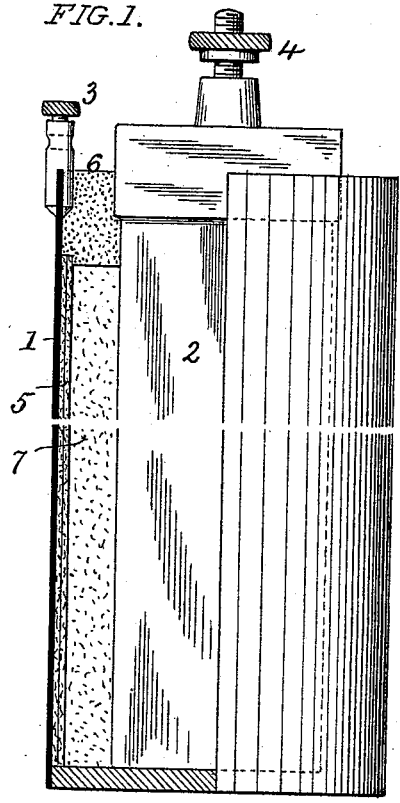
Figure 2:
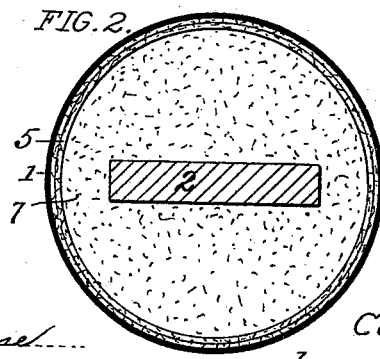

This present invention relates to that type of the primary galvanic battery, in which the contents are of a semi fluid nature, and which are commonly denominated "dry" batteries, the object of the present improvement being to provide a cheap, simple and efficient construction of such batteries, embodying the features of freedom from polarization, combined with an even and continued constancy in use. I attain such objects by the construction and arrangement of parts, illustrated in the accompanying drawings, in which:

Figure 1, is a view, one half in vertical section and one half in elevation, of a galvanic battery embodying my present invention; and Fig. 2, a horizontal section of the same.

Similar numerals of reference indicate like parts in both views.

As represented in the drawings, my improved battery consists of the usual outer zinc cup or casing 1, and the inner or central carbon electrode 2, having the usual binding posts 3 and 4, for the battery wires.

In the present improvement I arrange inside of the zinc cup or cylinder 1, and in contact with its interior surface a cylindrical lining 5 of porous material saturated with the exciting compound, such exciting compound being preferably of a semi fluid nature, and composed of starch paste five parts and sal-ammoniac one part. While the porous lining 5, will on account of its great cheapness consist of a winding of one or more layers of straw board, spring into place, and then fully saturated with a hot solution of the exciting fluid. In the construction shown the sealing cover 6 acts to hold the upper edge of the porous lining in contact with the zinc surface in a very simple and efficient manner.

Between the lining 5, and the carbon electrode 2, is placed the usual depolarizing filling 7, usually a compound of pulverized carbon, five parts, starch paste, one part, and peroxide of manganese, one part.

Having thus fully described my said invention, what I claim as new, and desire to secure by Letters Patent, is—

1. A galvanic battery, comprising in combination, an outer zinc cup, a porous lining of straw board, in surface contact therewith, and saturated with an exciting compound an inner electrode, and an interposed depolarizing filling, substantially as set forth.

2. A galvanic battery comprising in combination, an outer zinc cup a porous lining of straw board, held in surface contact with the zinc cup aforesaid by the sealing cover 6, and saturated with an exciting compound, an inner electrode and an interposed depolarizing filling, substantially as set forth.

In testimony whereof witness my hand this 2d day of June, 1891.

CLYDE J. COLEMAN.

In presence of—
ROBERT BURNS,
GEO. H. ARTHUR.